May 16, 1961 N. B. JOHNSON 2,984,416

HOT AIR HEATING METHODS

Filed Jan. 25, 1954 3 Sheets-Sheet 1

66
34
66
66
64
50
4
4
52
52
22
18a
16a
38
28
38
30
40
40
44
42
44
18
16
36
36
32
20

62
26
40
30
40
18
14
16
28

50
52
44
40
42
40
42
30
24
40
54
56
44
28

137' x 104' x 30'
10

8
8
428' Long-300' Wide-20' High.
10
10
7
7

10
10

10

United States Patent Office 2,984,416

Patented May 16, 1961

2,984,416

HOT AIR HEATING METHODS

Nelson B. Johnson, deceased, late of Winthrop, Mass., by Kenneth S. Johnson, administrator, 11 Nahant Ave., Winthrop, Mass.

Filed Jan. 25, 1954, Ser. No. 405,672

2 Claims. (Cl. 237—81)

This invention relates to an improvement in hot air heating methods. More particularly the invention provides an improved hot air heating method whereby entire unpartitioned floor areas of large buildings, such as warehouses, and the like, may be more effectively and more efficiently and economically heated, without any air distribution ducts or conduits, as compared with prior hot air heating procedures.

The present application is a continuation-in-part of application Serial No. 664,306, filed April 23, 1946, entitled Hot Air Heating Method and Apparatus, now abandoned.

It is among the objects of the invention to provide an improved method of heating unpartitioned interiors of large buildings comprising delivering large volumes of heated air from a heater directly into the space which is being heated while simultaneously withdrawing to the heater large volumes of cooler air from said space at a rate such that volumes of air equal to the entire cubical air contents of said space are withdrawn and replaced by heated air a plurality of times per hour of operation of the heater. According to the invention, the mentioned large volumes of air are effectively and economically heated and delivered into said space at temperatures not appreciably higher than 125° whereby the temperature of the delivered air is substantially closer to the temperature which it is desired to maintain in said space as compared with prior comparable heating procedures which conduct relatively smaller volumes of high temperature air through conduits to selected regions at which the hot air, at temperatures of 150–165° F., is propelled at high velocity into the selected regions.

Another object of the invention is to provide an improved method of heating unpartitioned interiors of large buildings comprising creating unconventionally large-volume circulatory flow of air in the space which is being heated whereby the entire cubical air contents of said space are passed through a heater a plurality of times per hour of operation of the heater with the heated air delivering from the heater, in unconventionally large volumes, directly into said space at temperatures not appreciably above 125° F., whereby said delivered air has less tendency to rise to and remain in the region of the roof or ceiling, as compared with prior comparable hot air heating systems wherein high temperature air in substantially smaller volumes is distributed through conduits to "spotted" locations of forcible discharge at temperatures of 150–165° F.

A further object of the invention is to provide an improved method of heating unpartitioned interiors of large buildings comprising withdrawing to a heater air from the space which is being heated at a rate and in volume such that the volume of air withdrawn during any hour of operation of the heater is a plurality of times greater than the entire volumetric capacity of said space, and simultaneously delivering heated air from the heater directly into said space in substantially equal volume and at temperatures not appreciably exceeding 125° F., whereby the entire cubical air contents of said space pass through the heater a plurality of times during any hour of operation of the heater, the flow of air through the heater being in response to created static pressure of from one-half to three-quarters of an inch of water, whereby the heated air delivering from the heater is relatively gently released in the said large volume, at temperatures substantially closer to the temperature desired in said space, as compared with prior hot air heating procedures, for spreading over and replacing the relatively cooler air which is being withdrawn to the heater in the said large volume.

It is, moreover, a general object of the invention to substantially increase the effectiveness and efficiency of hot air heating procedures and more especially such procedures as heretofore employed for the heating of unpartitioned interiors of relatively large buildings such as warehouses, and the like.

According to the method of the invention, interiors of buildings, and more especially unpartitioned interiors of large buildings, such as warehouses, and the like, may be efficiently and relatively uniformly heated by delivering, directly into the large space which is being heated, relatively huge volumes of heated air at temperatures which, as compared with prior comparable hot air heating procedures, are substantially closer to the temperature desired in the space which is being heated, whereby this delivered heated air has less tendency to rush up to and remain in the vicinity of the roof or ceiling. Simultaneously, cooler air is withdrawn from said space in equally large volumes, the magnitude of which is such that the entire cubical air contents of said space is withdrawn, heated, and re-delivered into the space a plurality of times during any hour of operation of the withdrawal means.

The delivering heated air has temperature not appreciably higher than 125° F. so that the huge volumes of delivering heated air is in condition to float on the cooler air, spreading thereon to all portions of the area of said space as the said large-volume withdrawal of the cooler air induces a relatively gentle circulatory effect at all portions of said area, with the heated air gradually sinking to replace the withdrawn cooler air. Preferably, the delivering heated air will have temperature within the range of 90–110° F. as compared with prior hot air heating procedures wherein high temperature air is distributed through conduits to selected regions of "spotted" discharge at each of which a forced blast of air is delivered into a selected region at temperatures within the range of 150–165° F.

According to the invention, the mentioned huge volumes of delivering relatively low-temperature heated air is relatively gently released from a single heater, or from two widely separated similar heaters, directly into the large space which is to be heated. Without any distribution ducts or conduits, the said large space becomes more effectively, efficiently and economically heated, with maintenance of substantially greater uniformity of temperatures throughout the area of said space, than has been possible with any prior comparable hot air heating method.

Figure 1:
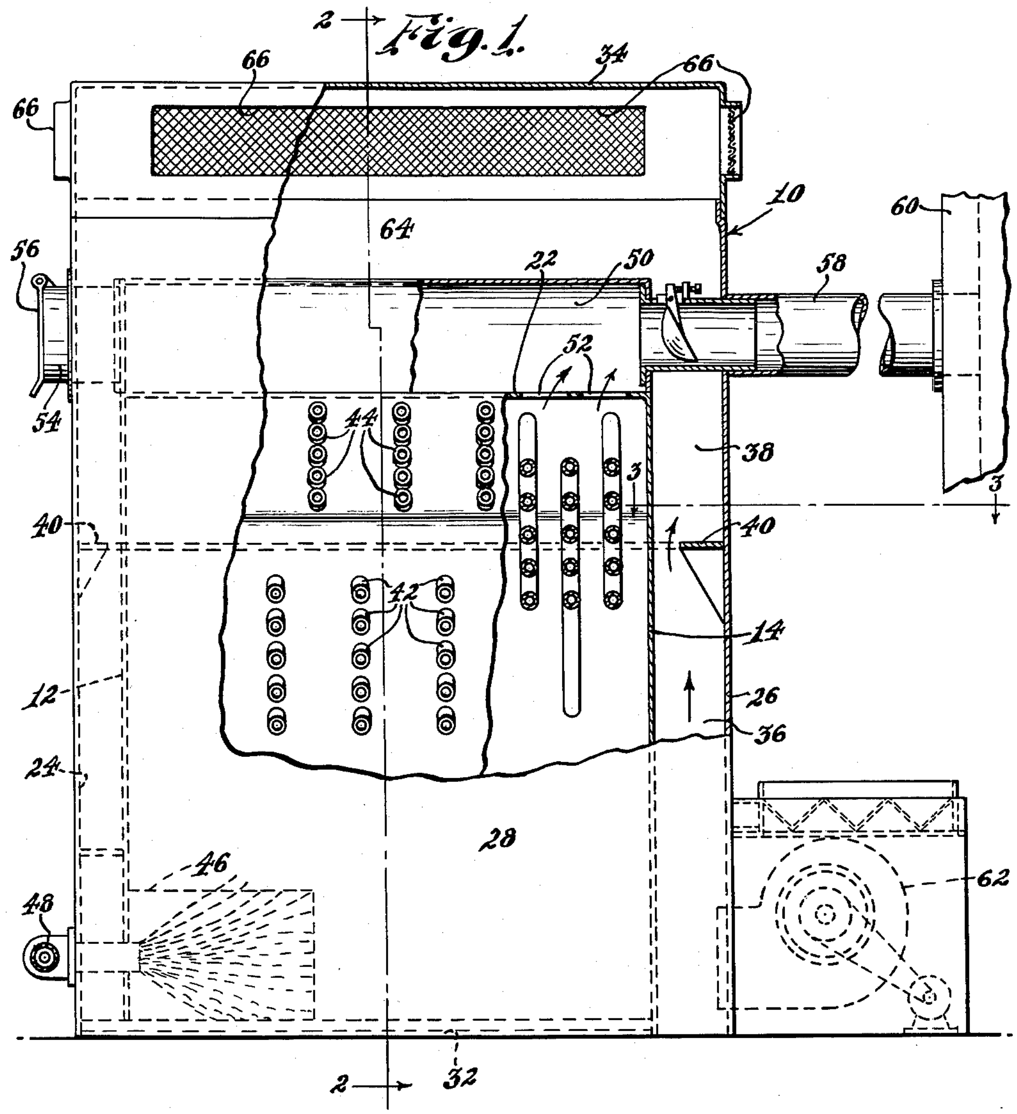
Fig. 1 is a side elevation of heating apparatus suitable for use in practicing the method of the invention, a portion of an outer casing wall and a portion of an inner core wall being broken away.
Figures 2, 3, 4, 5:
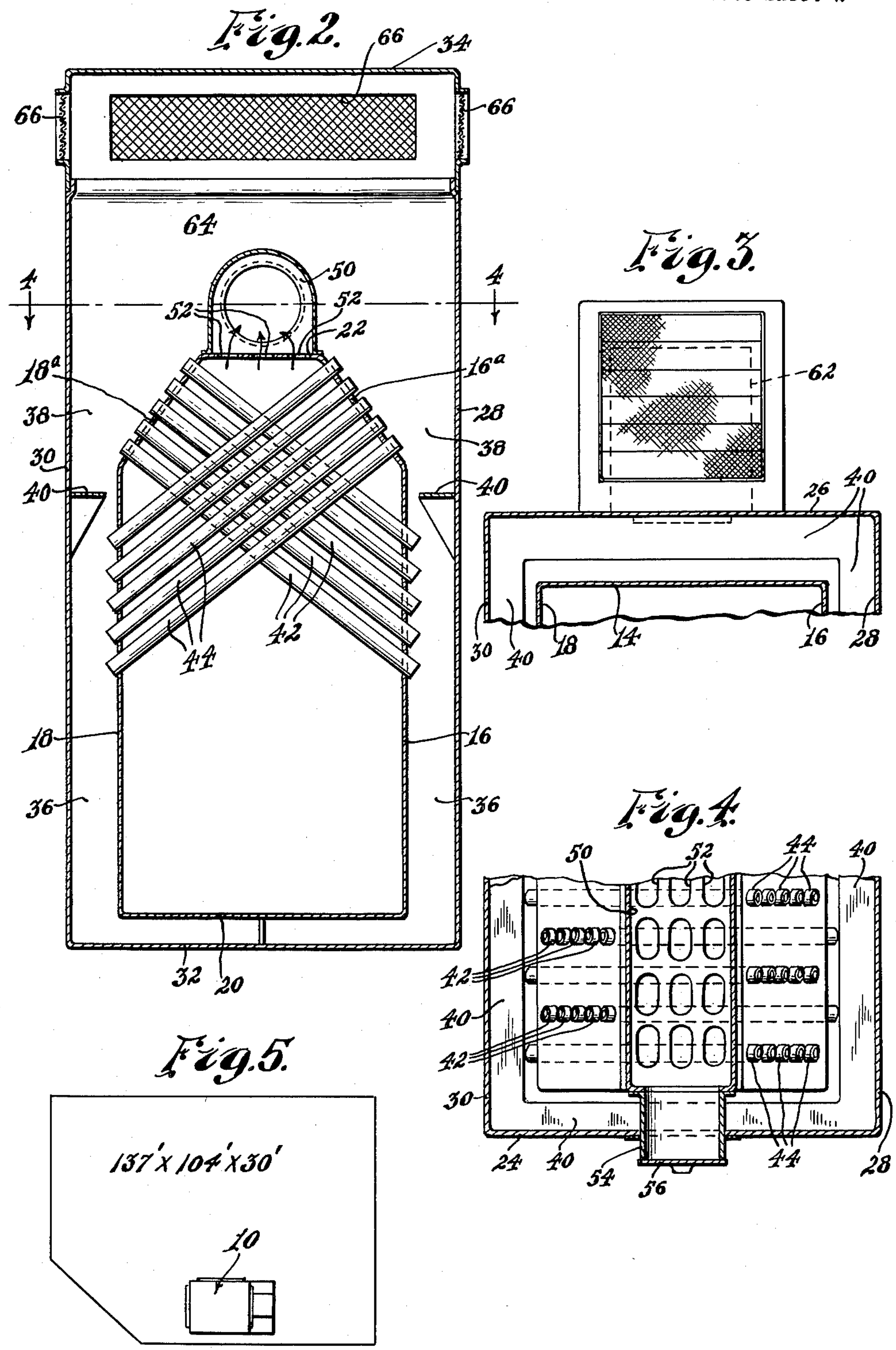
Fig. 2 is a cross-sectional view on line 2—2 of Fig. 1.
Fig. 3 is a fragmentary cross-sectional view on line 3—3 of Fig. 1.
Fig. 4 is a fragmentary cross-sectional view on line 4—4 of Fig. 2.
Fig. 5 is a diagrammatic representation of a floor area of a building heated by a single furnace or heater in accordance with the method of the invention.

As an example of the phenomenal heating results which are attained with the method of the invention, reference is made to the diagrammatic representation of Fig. 5, which illustrates the relative size of a furnace or heater 10 which can effectively and efficiently heat a large building having the dimensions as indicated, without any distribution ducts or conduits. This particular building is 137 feet long and 104 feet wide and has a monitor roof 30 feet high. There is large door at one corner. The single furnace or heater 10, of the relative size shown, efficiently heats this building which has an estimated heat loss of 2,000,000 B.t.u. per hour. The heater 10 has a blower associated therewith having a capacity for handling 23,000 cubic feet of air per minute which results in substantially the entire cubical air contents of the building being circulated through the heater 10 three times during any hour of operation of the blower. Relatively cool air in the indicated large volumes is withdrawn by the blower from the interior space of the building relatively close to the floor of the building and heated in heater 10 for release in the indicated large volumes directly into the said interior space at an elevation around 9 feet from the floor. The particular heater 10 in the building of Fig. 5 has capacity for generating 2,500,000 B.t.u. per hour and the heated air delivers from the furnace or heater 10 at temperatures not appreciably exceeding 125° F. which is a desirable and efficient delivery temperature for the illustrated installation.

Figure 6:
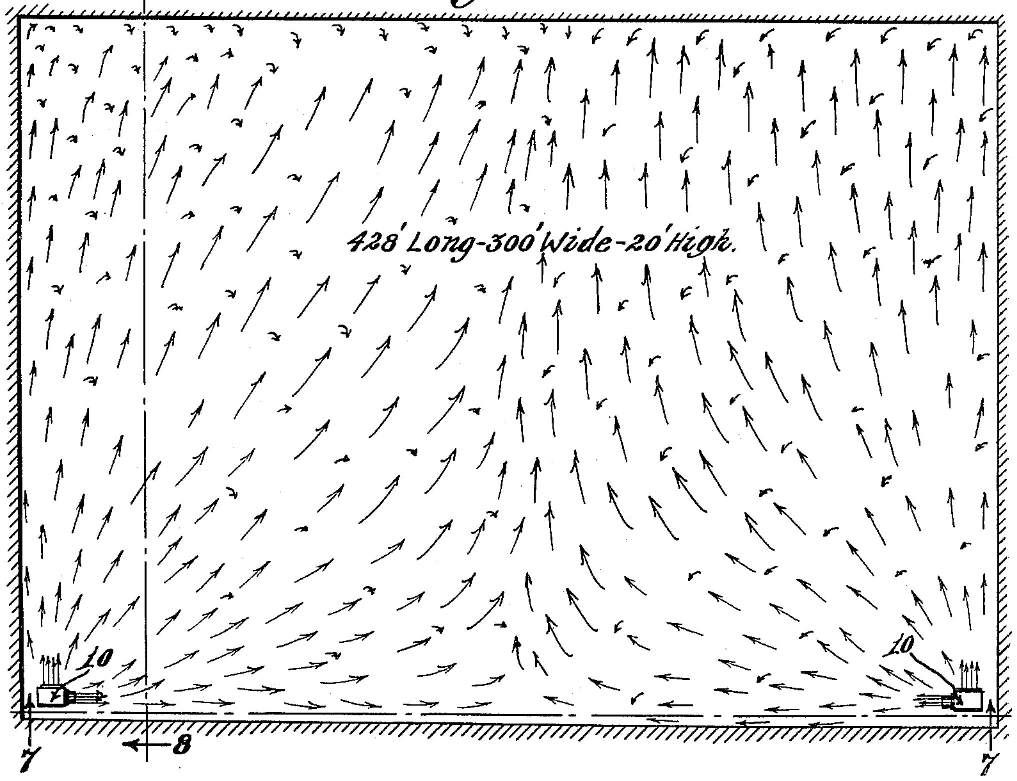
Fig. 6 is a diagrammatic representation of the floor-area of a larger building heated by two furnaces or heaters in accordance with the method of the invention, the arrows indicating the spreading of the delivered heated air to all portions of the area of the building, the walls of the building being in cross-section.
Figure 7:
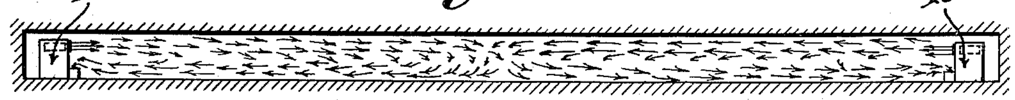
Fig. 7 is a cross-sectional view on line 7—7 of Fig. 6, the arrows indicating the approximate circulatory pattern of the air.
Figure 8:
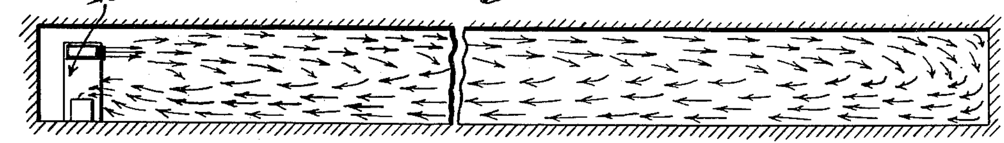
Fig. 8 is a cross-sectional view on line 8—8 of Fig. 6, the arrows indicating the approximate circulatory pattern of the air.

Figs. 6–8 diagrammatically illustrate a substantially larger building whose unpartitioned interior is being effectively and efficiently heated by the two similar furnaces or heaters 10 in accordance with the method of the invention. This building is a warehouse 428′ long and 300′ wide with a ceiling 20′ above the floor level. The two heaters 10, of the relative size shown, and located at corners of the building, illustrate the phenomenal nature of the invention and the reason why heating engineers, architects and building contractors initially opposed and refused to install the Johnson hot air heating system and method as contrary to accepted heating practices and procedures. They initially were strong in their criticism of the Johnson proposals and claimed results, maintaining that it would be impossible to effectively heat particular buildings with the one, or two, relatively small heaters with no distribution ducts or conduits. Nothwithstanding this initial opposition and criticism by the heating experts, the Johnson system and method ultimately were accepted and put into practice in particular buildings. The same heating experts and others who had strongly opposed and criticized the Johnson system and method were invited to witness and experience the Johnson heating results in these particular buildings. The travel of the air was demonstrated by smoke tests, and the substantial uniformity of temperature through the area of the building interiors was demonstrated by thermostat readings taken at various locations relatively close to and far removed from the heater or heaters. These heating engineers and others frankly expressed their amazement at the Johnson heating results, and willingly executed affidavits testifying to the definitely unexpected efficiency and uniformity of heating attained by the Johnson hot air heating method. These affidavits have been made of record in the parent application earlier identified herein.

In the practice of the method of the invention, it is essential that the heater, or heaters, 10 be capable of effectively heating the relatively huge volumes of air that is required to pass through it or them during any period of operation of the heater or heaters. Also, it is important that the delivering heated air have temperature not appreciably exceeding 125° F., the preferred temperature being between 90–110° F.

Heating apparatus suitable for practicing the method of the invention is illustrated in Figs. 1–4 wherein a generally rectangular sheet metal core has a front wall 12, a rear wall 14, two side walls 16, 18, a bottom wall 20, and top wall portions 16a, 18a, 22 of which the portions 16a, 18a are continuations of the side walls 16, 18, respectively, with inclination toward each other, and portion 22 is disposed horizontally and extends between the upper edges of the wall portions 14a, 16a. The core is completely enclosed within a sheet metal outer casing which comprises a front wall 24, a rear wall 26, two side walls 28, 30, a bottom wall 32 and a top wall 34, all six walls of the casing being spaced from the core walls to provide substantial air spaces all around the core.

The space between the core and the outer casing is divided at a mid-location in the height of the furnace into a lower air jacket indicated generally at 36 and an upper air jacket indicated generally at 38. As represented, the division is effected all around the core by baffle elements 40 which extend inward from the outer casing walls and terminate short of the inner core walls, whereby a relatively narrow passage is open past each baffle element 40 for restricted flow of air from the lower air jacket 36 into the upper air jacket 38.

Banks of relatively small diameter tubes 42, 44 extend in spaced relation, and at inclinations to a horizontal plane, across the space between the core side walls 16, 18. The lower ends of all of the tubes 42 extend through the core side wall 16 and are open into the lower air jacket 36, below the plane of the baffle elements 40, and the upper ends of all of the tubes 42 extend through the inclined top wall portion 18a and are open into the upper air jacket 38, above the plane of the baffle elements 40. Similarly, the lower ends of all of the tubes 44 extend through the core side wall 18 and are open into the lower air jacket 36, below the plane of the baffle elements 40, and the upper ends of all of the tubes 44 extend through the inclined top wall portion 16a and are open into the upper air jacket 38, above the plane of the baffle elements 40.

A conventional fire box is indicated generally at 46, and an oil burner is represented at 48, although any heat-generating means may be employed. Substantially the entire surface area of each of the multiplicity of tubes 42, 44 is exposed in the midst of the hot products of combustion within the core, and these hot products circulate around and in intimate contact with the tube surfaces on their course to the smoke bonnet 50 above. The tubes 42, 44 all are straight tubes spaced relatively little from adjacent crossing tubes, and their arrangement in two banks of inclined tubes ensures maximum surface areas of tube walls exposed to contact by the hot gaseous products of combustion. Also, the multiplicity of tubes cummulatively constitute a substantial obstruction delaying escape of the hot products of combustion into smoke bonnet 50, thereby ensuring maximum heat exchange between the hot gases and the tubes.

The smoke bonnet 50 is mounted on the top wall portion 22 of the core and provides a generally horizontal chamber or conduit extending from the front to the rear of the core, and openings 52 in core top wall portion 22 constitute exhaust openings for passage of smoke and other products of combustion from the interior of the core to the smoke bonnet 50. A short pipe 54 is connected to the front end of bonnet 50 and opens through the front wall 24 of the outer casing, with a suitable clean-out closure 56 thereon. The rear end of the smoke bonnet is connected by smoke pipe 58 through the rear wall 26 of the outer casing for conducting smoke and gases to any conventional chimney, indicated generally at 60.

A large capacity blower 62 is connected through the rear wall 26 of the outer casing for drawing cool air in large volume from the interior of a building and delivering it into the lower air jacket 36. The capacity of the blower, the size of the passages for direct flow of air past the baffle elements 40, and the cumulative cross-sectional area of the tube passages will be coordinated to provide a static pressure in the lower air jacket 36 of from one-half to three-quarters of an inch of water.

Some of this delivered air is propelled by the existing static pressure directly upward past the baffle elements 40 into the relatively large capacity plenum chamber 64 above the core, and this direct-flowing air bathes the adjacent hot core walls and becomes heated thereby before entering the plenum chamber 64. Other substantial volumes of air delivered by the blower are propelled by the static pressure through the multiplicity of small diameter tubes 42, 44 and deliver in heated condition into the plenum chamber 64 wherein it mixes with the warmed air delivering past the baffle elements 40. Heated air from the plenum chamber is released through screened outlets 66 directly into the interior of the building which is being heated, and it will be noted that the plenum chamber 64 and the outlets 66 therefrom are so relatively large that the warm air from the plenum chamber is relatively gently released without any substantial build-up of static pressure in the plenum chamber.

It has been determined and demonstrated by smoke tests that warm air, gently released in the indicated large volume, gradually spreads out over the cooler air and ultimately reaches to all portions of the space being heated, and gradually sinks to replace the air which has become cooled due to heat losses at windows, doors, outside walls, etc. as this cooler air is gently withdrawn in large volume back to the heater.

Actually, when one walks through a building heated in accordance with the present method, such as the warehouse of Figs. 6–8, it is inconceivable that the temperature could be maintained with such small variance throughout the building. Thermometer readings at the wall farthest from the heater units 10 give readings which are substantially the same (not more than 1 or 2° less) as readings at location much closer to the units 10 yet the said farthest wall is nearly 300′, or more, distant from a unit 10, with no distribution conduits or ducts. The particular warehouse of Figs. 6–8 has a horizontal ceiling twenty feet above the floor, but comparable heating efficiency and uniformity of temperatures are attained in buildings having no ceiling intervening between slanted roofs. In the latter variety of buildings initial build-up to the desired temperature may require a somewhat longer time, but once the desired temperature is attained, subsequent maintenance thereof is accomplished efficiently and uniformly as described in connection with Figs. 6–8.

It is intended that the patent shall cover, by suitable expression in the appended claims, whatever features of patentable novelty exist in the invention disclosed.

What is claimed is:

1. The method of attaining duct-free substantially uniform warm air heating of buildings of the class having unpartitioned interior space with floor area at least as large as 5,000 square feet, comprising relatively gently withdrawing air from a lower region of the said interior space by a relatively low velocity high output air moving means and delivering the withdrawn air into a lower compartment of a heater at a predetermined volumetric rate such that the per hour delivered volume of air is a plurality of times greater than the entire cubical air contents of said interior space which is to be heated, substantially elevating the temperature of air within the heater by creating a relatively small static pressure not exceeding ¾ inch of water in said lower compartment and thereby forcing relatively large volumes of air from said lower compartment into lower ends of a multiplicity of inclined relatively small diameter open-ended heat-exchange tubes, followed by substantially reducing the pressure and temperature of the heated air issuing from upper ends of said tubes by collecting the heated air in an upper plenum chamber having volumetric capacity greatly exceeding the volumetric capacity of said lower compartment, and then further reducing the temperature of the air in said plenum chamber to a temperature not appreciably above 125° F. by mixing within the plenum chamber the collected heated air with relatively cooler air supplied to the plenum chamber at a predetermined volumetric rate, and maintaining the said reduced pressure and temperature within the plenum chamber against back-pressure build-up by releasing the air from said chamber directly into the interior space which is to be heated through openings having area for accommodating relatively gentle low-pressure outflow of the reduced temperature air at a volumetric rate approximating the said volumetric rate of delivery of air into said lower compartment of the heater, whereby said large volumes of gently released air having temperature not greatly above the temperature to be maintained in said interior space of the building spreads gently and naturally over the entire area of said interior space, tending to reach the coolest regions within said interior space.

2. The method of attaining duct-free substantially uniform warm air heating of buildings of the class having unpartitioned interior space with floor area at least as large as 5,000 square feet, comprising predetermining the cubical air contents of the interior space which is to be heated and providing a low velocity large output air-moving means for relatively gently withdrawing air from a lower region of said interior space and delivering the withdrawn air into a lower compartment of an air heater at a volumetric rate such that the per hour delivered volume of air is a plurality of times greater than said predetermined cubical air contents of said interior space, creating a relatively low static pressure not exceeding ¾ inch of water in said lower compartment and substantially elevating the temperature of air delivered into said lower compartment by forcing it under said static pressure into lower ends of a multiplicity of inclined small diameter open-ended heat-exchange tubes, and then substantially reducing the pressure and temperature of the heated air issuing from upper ends of said tubes by collecting the heated air in an expanded, reduced-pressure condition within an upper plenum chamber having volumetric capacity greatly exceeding the volumetric capacity of said lower compartment of the heater, followed by further reducing the temperature of the air in said plenum chamber by mixing the collected heated air therein with cooler air escaping from said lower compartment directly into the plenum chamber at a predetermined volumetric rate to reduce the air temperature in said chamber to a temperature of the order of from 90° F. to 100° F., and maintaining the said reduced pressure and temperature within the plenum chamber against back-pressure build-up by releasing the air from said chamber directly into the said interior space through large-area openings whose cumulative area accommodates relatively gentle low-pressure outflow of the reduced temperature air at a volumetric rate approximating the said volumetric rate of delivery of air into said lower compartment, whereby said relatively large volumes of gently released air having temperature not greatly exceeding the temperature to be maintained in said interior space spreads gently and naturally over the entire area of said interior space, tending to reach the coolest regions thereof, for maintaining substantially uniform temperature throughout the area of said interior space.

References Cited in the file of this patent

UNITED STATES PATENTS

| | | |
|---|---|---|
| 1,343,330 | Miles | June 15, 1920 |
| 1,686,070 | Burmester | Oct. 2, 1928 |
| 1,930,842 | Paige | Oct. 17, 1933 |
| 1,944,488 | Bertossa | Jan. 23, 1934 |
| 1,964,881 | Keefe | July 3, 1934 |
| 2,023,447 | Shurtleff | Dec. 10, 1935 |
| 2,162,084 | Hoffman | June 13, 1939 |
| 2,355,495 | Zier | Aug. 8, 1944 |
| 2,376,140 | Henderson et al. | May 15, 1945 |